June 23, 1925.
H. E. HUGHES
WEED DESTROYING COMPOSITION AND PROCESS OF PRODUCING THE SAME
Filed Aug. 26, 1924
1,543,107
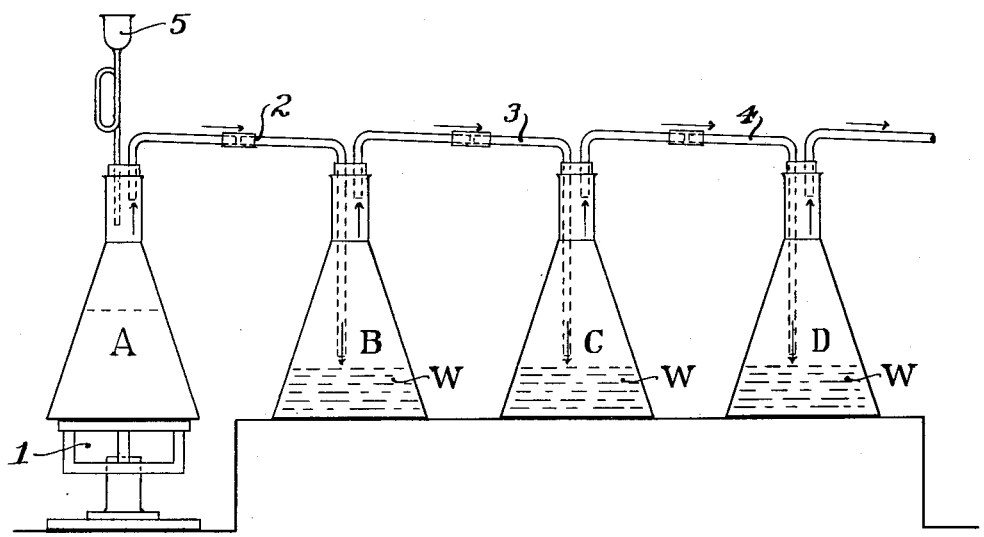
INVENTOR
Hugh Edward Hughes
BY Book & Book
ATTORNEYS Patented June 23, 1925.

1,543,107

UNITED STATES PATENT OFFICE.

HUGH EDWARD HUGHES, OF BERKELEY, CALIFORNIA, ASSIGNOR, BY DIRECT AND MESNE ASSIGNMENTS, TO THE WEED CONTROL COMPANY OF CALIFORNIA, OF BERKELEY, CALIFORNIA, A CORPORATION OF CALIFORNIA.

WEED-DESTROYING COMPOSITION AND PROCESS OF PRODUCING THE SAME.

Application filed August 26, 1924. Serial No. 734,200.

*To all whom it may concern:*

Be it known that I, HUGH EDWARD HUGHES, a citizen of the United States, residing at Berkeley, in the county of Alameda and State of California, have invented certain new and useful Improvements in Weed-Destroying Compositions and Processes of Producing the Same, of which the following is a specification.

My invention relates, in general, to the art of destroying undesirable vegetation, and, in particular, to chemical compositions for this purpose and to methods of producing them.

Successful weed eradication depends fundamentally upon penetration of the destructive agent, and, practically, upon such leaf absorption of the agent as will produce root destruction. Plant growth is the constant gradual accumulation of acidic substance. To successfully destroy plant growth requires constant gradual accumulation of a mild acidic toxin within the plant.

The object of my invention is to produce economically an efficient toxin for this purpose, in compact concentrated form adapting it to be shipped to distant points and there, by suitable dilution, do the work at a cost greatly below the value obtained by its use.

The essential ingredients of my composition are sulfuric acid, hydrochloric acid, arsenic (white), saltpeter, either potassium nitrate or its equivalent sodium nitrate, solution-water, and a liquid comprising water saturated or charged with the vapors driven off by the distillation of the mixture of the other ingredients during its initial preparation.

It may be well at the outset, in order to fully understand my invention to state that I am aware that sulfuric acid, hydrochloric acid, arsenic and saltpeter are known in the art of weed destruction to possess properties adapted for this use and that they enter into compositions for this purpose. I have found, however, from practical experience that they lack coordination when combined, are incomplete, and do not accomplish the desired purpose, their use being limited and their application wasteful, dangerous and inefficient.

It will, therefore, be appreciated that in asserting the novelty of my composition I rely upon the presence and effect of that ingredient in my composition and that step in my process, which is expressed by water saturated or impregnated with the vapors of distillation of the mixture of said chemical substances.

I find that these substances when compounded according to my invention result in a new and distinctly different composition. It becomes in its final form a permanent, yellow liquid, which is a weed-destroying chemical concentrate, possessing every requirement for the economical, safe and efficient control of plant life.

When this concentrate is finally diluted with the required amount of water in the field, it forms a mild, acidic, hygroscopic, corrosive, penetrating toxin in perfect harmony with plant substance and plant circulation, and when sprinkled upon the leaves it remains moist giving the leaves ample time for absorption while effecting a gradual accumulation of toxin in the roots.

In this composition, it will readily be understood that the sulphuric acid is hygroscopic in function, the hydrochloric acid is a solvent, the arsenic is a poison, and the saltpeter has the property of penetration and diffusion.

What the exact function of the vapor saturated water element is, I am unable to state in chemical equation even if it have such reaction, but from a practical standpoint, it will be seen that I obtain an initial concentration of the product highly desirable from a commercial standpoint, without the loss of any of the advantageous properties of the ingredients, and I know from practice that the concentrated product is capable of better results in every particular than a simple mixture of the substances would yield.

In preparing my composition I will give the following proportions as an example, it being understood that it is capable of variation within reasonable limits.

I use 20 parts of commercial sulfuric acid; 21 parts of commercial hydrochloric acid; 18 parts of solution water; 9 parts of white arsenic and 2 and a quarter parts of saltpeter.

In preparing the composition, I first heat the saltpeter in 8 ounces of water until dissolved and I allow the solution to cool. Into this solution I then pour the sulfuric acid and let the mixture cool.

Separately, I boil the arsenic in the hydrochloric acid, until the arsenic is fully dissolved, and while the solution is boiling, I pour into it the previously prepared sulfuric acid solution of saltpeter.

To this combined solution, while still boiling, I add, cold, 23 fluid ounces of water saturated or charged with all the condensed vapors which have come from the previous preparations of the foregoing solutions and their mixture. The resulting composition then consists of 72 fluid ounces of liquid with 11 and a quarter ounces of solids in solution, and this solution is brought to a boil and kept boiling until it has evaporated to 64 ounces, when it is allowed to cool. In the accompanying drawing, to which reference is now made, I show an apparatus from a consideration of which the process will be fully understood.

A is a container which is subjected to a burner 1. B is a container which communicates with container A by a pipe 2. C is a container which communicates with container B by a pipe 3. D is a container which communicates with container C by a pipe 4. 5 is a filling funnel for container A. In each of the containers B, C and D, there is a body of water indicated by W. I first place in container A the saltpeter and water and make a solution under heat. The heat is then turned off and the solution allowed to cool. Then the sulfuric acid is added slowly, and the mixture permitted to cool. The gases and vapors passing over from container A charge the water in containers B, C and D to a progressively reducing extent. The sulfuric acid-saltpeter solution is now removed from container A, and replaced by the arsenic and hydrochloric acid, the latter mixture being boiled until the arsenic is dissolved, the gases and vapors from the solution passing over to further charge the waters in containers B, C and D. While the arsenic solution is still boiling I pour into it in container A the previously removed saltpeter solution, and continue the boiling and the gases and vapors of the full mixture in A pass over into B, C and D.

In practice, I thus distil the gases and vapors from several, say six or more batches of the chemicals in container A, before the water in the container B is sufficiently charged. This water I remove and confine it temporarily in a separate vessel. I then pour the water from C into B, and from D into C, and put fresh water into D. The strength of the charging is thus stepped up and when there is enough of the fully charged water, which I prefer to set aside for say 24 hours, I will have about 23 fluid ounces and this I then add, cold, to the boiling mixture in container A, and the boiling is continued until the complete composition has been concentrated to about 64 ounces, which is then allowed to cool and is ready for shipment and use.

The charging vapors comprise chlorine, nitrogen, peroxid, sulfur dioxid and other elements, and these condense in the water. I have found that the mixture, without this charged ingredient, or without enough of it, breaks down into an oil, crystals and a liquid, but with it the mixture remains intact.

Many field tests have proven that one part of my compound to 10 parts of water kills all annual weeds and wild morning glory, and destroys the roots of this last named pest to a depth of three feet in six days.

I claim:

1. A composition for the described purpose comprising sulfuric acid, hydrochloric acid, arsenic, saltpeter, solution water, and water charged with the condensed distilled vapors of the mixture of said acids, arsenic and saltpeter.

2. The process of producing the herein described composition which consists in mixing under distilling temperature an aggregate of sulfuric acid, hydrochloric acid, arsenic, saltpeter and water; charging water with the vapors of said distillation; and adding to the distilled aggregate said charged water.

3. The process of producing the herein described composition which consists in mixing under distilling temperature, saltpeter, sulfuric acid and water; separately mixing under distilling temperature arsenic and hydrochloric acid; combining the two mixtures under distilling temperature; charging water with the vapors of said distillations; and finally adding said charged water to the distilled combined mixture.

In testimony whereof I have signed my name to this specification.

HUGH EDWARD HUGHES.